United States Patent
Grewal et al.

(10) Patent No.: US 9,063,751 B2
(45) Date of Patent: Jun. 23, 2015

(54) SINGLE WIRE BOOTLOADER FOR TARGET DEVICE WITH SELF-PROGRAMMING CAPABILITY

(75) Inventors: Gurbrinder Grewal, San Jose, CA (US); Vemund Kval Bakken, Menlo Park, CA (US)

(73) Assignee: Atmel Corporation, San Jose, CA (US)

( * ) Notice: Subject to any disclaimer, the term of this patent is extended or adjusted under 35 U.S.C. 154(b) by 410 days.

(21) Appl. No.: 13/402,807

(22) Filed: Feb. 22, 2012

(65) Prior Publication Data

US 2013/0219159 A1 Aug. 22, 2013

(51) Int. Cl.
*G06F 9/00* (2006.01)
*G06F 9/44* (2006.01)

(52) U.S. Cl.
CPC ............ *G06F 9/4401* (2013.01); *G06F 9/4406* (2013.01)

(58) Field of Classification Search
CPC ....... G06F 9/44; G06F 15/177; G06F 9/4401; G06F 9/4406
USPC .......................................... 713/1, 2
See application file for complete search history.

(56) References Cited

U.S. PATENT DOCUMENTS

| | | | |
|---|---|---|---|
| 7,366,890 B2 * | 4/2008 | Blinick et al. ................. 713/2 |
| 8,082,438 B2 * | 12/2011 | Chieng et al. ................. 713/2 |
| 8,176,310 B2 * | 5/2012 | Xu ................................. 713/2 |
| 2006/0153326 A1 * | 7/2006 | Choi ........................... 375/360 |
| 2010/0281145 A1 * | 11/2010 | Sullam et al. ................. 713/2 |

OTHER PUBLICATIONS

AVR247: Single-wire Software UART, 8-bit AVR Microcontrollers Application Note, Mar. 2007.*

* cited by examiner

*Primary Examiner* — Thuan Du
(74) *Attorney, Agent, or Firm* — Fish & Richardson P.C.

(57) ABSTRACT

A single-wire bootloader software architecture is disclosed that interfaces with any host device that has a serial port to program memory of a target device using only a single general-purpose I/O pin. The single-wire bootloader does not require any chip hardware resource modules. Instead, the single-wire bootloader implements a single-wire UART in software that monitors a single general-purpose I/O pin for commands from the host device.

20 Claims, 2 Drawing Sheets

SINGLE WIRE BOOTLOADER FOR TARGET DEVICE WITH SELF-PROGRAMMING CAPABILITY

TECHNICAL FIELD

This disclosure relates generally to electronics and more particularly to bootloaders for target devices, such as microcontrollers.

BACKGROUND

A bootloader is computer code that is usually executed before an Operating System (OS) starts to run. Bootloader code is usually processor specific and performs several important tasks, such as facilitating memory management functions (e.g., program, erase verify flash memory).

To program a microcontroller, a programmer application running on a host device is needed that is compatible with the target device. Apart from being expensive, a programmer application might have other disadvantages, like long programming times and too many interconnections between the microcontroller and the programmer. Upgrading firmware for a shipped product can become tedious because of non-availability of a programming port. Even in laboratories, it might not be practicable to get a programmer application for each working bench, and the best solution available may be to provide microcontroller samples, which have already been programmed once with the bootloader in the program memory.

SUMMARY

A single-wire bootloader software architecture is disclosed that interfaces with any host device (e.g., a personal computer or other microcontroller) that has a serial port (or a USB port with a USB-Serial bridge cable) to download code to memory of a target device using only a single pin. The single-wire bootloader can be used with devices that are lacking a separate bootloader section and hardware communication modules. The single-wire bootloader does not require any chip resources, such as Two-wire Interface (TWI), Serial Port Interface (SPI) or Universal Asynchronous Receiver/Transmitter (UART) hardware modules. Instead, the single-wire bootloader implements a single-wire UART in software, which requires only one general-purpose I/O pin.

In some implementations, a host UART transmitter (Tx) and Receiver (Rx) are shorted and connected to a general-purpose I/O (GPIO) pin of the target device. The target device can be any device requiring bootloading or self-programming capability. The host (e.g., a personal computer) runs a programmer application for programming the target device over the GPIO pin. The target device can implement a single-wire UART by bit banging the GPIO. Text commands can be sent by the programming application and received by the target device, which performs the bootloading tasks, such as programming, erasing and verifying memory (e.g., flash memory).

In some implementations, the software bootloader can reside in memory of the target device and be write-protected. During memory upgrades, a reset vector in memory, as well as other interrupt vectors can also be write-protected. The target device resources used by the bootloader can be made available to the bootloader by using an interrupt vector table shadow.

In some implementations, the target device stores a reset vector stored in memory that is read only. The reset vector can be used to place the target device into a bootloader mode in response to a hardware reset of the target device. When the target device starts-up in bootloader mode, it checks the target device memory for a bootloader flag. If the bootloader flag is set, the bootloader starts listening to the GPIO pin for commands (e.g., text commands) from the programming application running on the host device. Otherwise, the bootloader program executes a jump to application code that is residing in a different location of memory of the target device. To put the target device in bootloader mode from a running application, the application can write the bootloader flag in memory and execute a jump to the reset vector. The reset vector jumps to the bootloader code, which then executes as previously described.

Particular implementations of the disclosed single-wire bootloader provides several advantages: 1) the bootloader does not require any built in interface module or additional pin making it ideal for low cost, low pin count devices; 2) all of the bootloading tasks (e.g., launching the bootloader, programming, verification of memory) require only one pin; 3) the bootloader can be launched any time without the need of asserting any other pin, thus reducing microcontroller design and programming complexity; 4) the bootloader can be connected through a serial cable to any host device running a programmer application; 5) the bootloader can use text command-based protocol for ease of use; and 6) a target device using the bootloader need not support the bootloader with hardware communication modules.

The details of one or more disclosed implementations are set forth in the accompanying drawings and the description below. Other features, aspects, and advantages will become apparent from the description, the drawings and the claims.

DETAILED DESCRIPTION

Example Single-Wire Bootloader System

Figure 1:
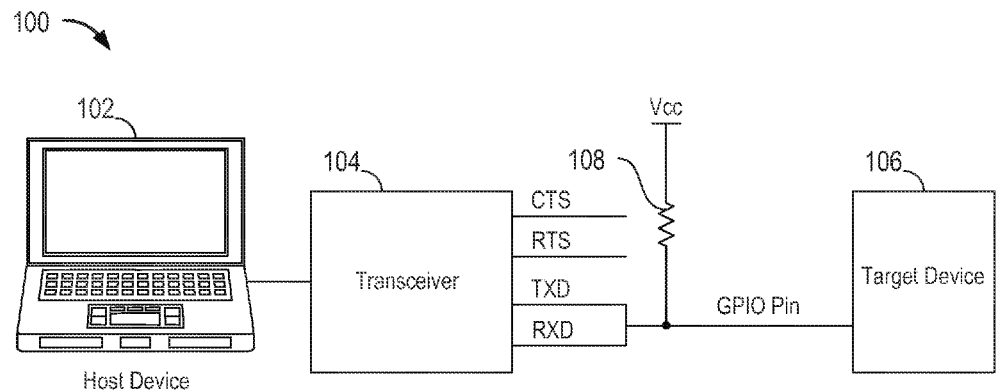
FIG. 1 is a simplified block diagram of an example single-wire bootloader system 100 for programming memory of a target device.

FIG. 1 is a simplified block diagram of an example single-wire bootloader system for programming memory of a target device. In some implementations, a single-wire bootloader system 100 can include host device 102, transceiver 104 and target device 106. Target device 106 can include memory 107, such as non-volatile memory (e.g., flash memory) for storing bootloader code and other code or interrupt vectors (e.g., application code, reset vector).

Host device 102 can be any device capable of communicating with target device 106, including but not limited to a personal computer. In the example shown, host device 102 is a personal computer that is capable of running a programmer application for programming target device 106 through transceiver 104.

Target device 106 can be any device capable of being programmed, including but not limited to a microcontroller. In the example shown, target device 106 is a microcontroller that is lacking a separate bootloader section and hardware communication modules. Target device 106 can include memory for storing bootloader code and other code (e.g., application code).

Transceiver 104 can be any device capable of receiving commands from host device 102 and transmitting the commands to target device 106. Transceiver 104 can be a device that includes signal conditioning circuitry and firmware for formatting commands from host device 102 into a format that is compatible with target device 106. In the example shown, transceiver 104 is an RS-232 transceiver that provides serial binary single-ended data and control signals connecting host device 102 to target device 106. For clarity, only the Request to Send (RTS) and Clear to Send (CTS) control signals are shown. Other control signals are not shown, such as Data Terminal Ready (DTR) and Data Set Ready (DSR). Also shown are the Transmitted Data (TxD) and Received Data (RxD) signals. Normally, TxD carries data from host device 102 to target device 106 and RxD carries data from target device 106 to host device 102. In system 100, however, the TxD and RxD data lines are connected together and to a single GPIO pin of target device 106. A pull-up resistor 108 coupled to GPIO pin allows the pin to be high when no transmission is ongoing.

As will be described in further detail below, a programmer application running on host device 102 will send programming commands or instructions to target device 106 through transceiver 104. A software implemented UART running on target device 106 can receive the commands from transceiver 104 and perform various actions based on the commands. An example software implemented UART is described in "AVR274: Single-wire Software UART" Application Note (Rev. 8065A-AVR-03/07), which is publicly available from Atmel Corporation, San Jose, Calif., USA, and is incorporated by reference herein in its entirety.

The application note (hereinafter "software UART application note") is for use with Atmel's 8-bit AVR microcontrollers. However, the software UART application note is also applicable to other types of microcontrollers and devices. The software UART application note describes code (written as a driver) for UART communication. The software UART described in the software UART application note can be modified for polling based design to prevent the bootloader from using system interrupts and vectors, thus making all system resources for the target device 106 available for applications.

UART communications are usually implemented using separate data wires for reception and transmission. The single-wire UART uses only a single-wire for communication, and is therefore ideal for low cost solutions where no high-speed, full duplex communication is needed. The software implemented UART running on target device 106 supports half duplex communication between host device 102 and target device 106. Target device 106 can include a GPIO pin that supports external interrupt and a timer compare interrupt.

The protocol used by the UART is an asynchronous serial communication standard where data is transferred sequentially, one bit at a time. In some implementations, a data frame can consist of eight data bits, one start bit and two stop bits. Other implementations may use different frame formats consisting of five to nine data bits, one parity bit for error control and one stop bit. The line can be high when no transmission is ongoing by coupling pull-up resistor 108 to the transmission line. Transmission can be initialized by sending the start bit (pulling the line low) for one bit period. The UART receiver detects the falling edge and is then able to synchronize to the UART transmitter. The least significant bit of the data bits can be sent first.

Open collector outputs can be used to drive the line, but if both the host device 102 and target device 106 are transmitting at the same time, the transmitter sending a low bit will pull the line low even if the other transmitter is sending a high bit. To handle this situation the UART can be configured not to transmit data while receiving data. The transmitter can also sample the line before transmitting a new bit to make sure the line has not changed since the last bit was transmitted. An error flag can be set if a low bit is received when a high bit was last transmitted.

Reception can be started when the start bit is detected. The data bits can be sampled in the middle of every period. The first data bit can be sampled one and a half bit period after the start bit is detected. In some implementations, an n-samples (e.g., three samples) majority vote can be used by the UART to minimize clock cycles used by the driver.

In UART communication, speed can be defined by the baud rate. The baud rate is in this case can equal to the number of bits transmitted per second including the start and stop bits. The UART receiver and transmitter can be set up using the same baud rate to maintain their synchronization. Baud rates can be 4800, 9600, 19200, 28800 and 38400, but other rates may also be used.

There are several error conditions that can occur. If the baud rate differs too much on host device 102 and target device 106, they can get unsynchronized. Since the baud rate is dependent on a clock frequency, this problem can occur if the clock differs from the intended value. If using an internal RC oscillator for the clock, the oscillator can be calibrated before using the UART.

Figure 2:
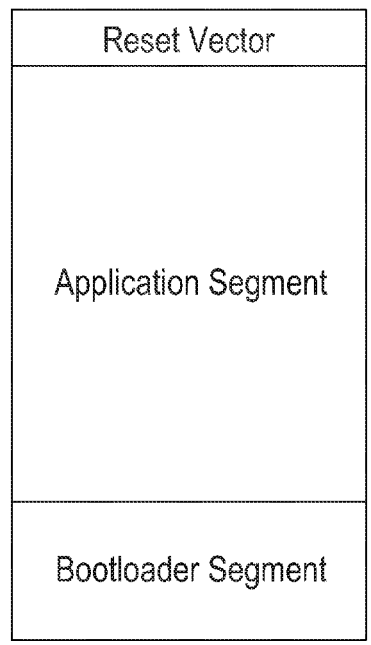
FIG. 2 is an example memory map for a target device implementing the single-wire bootloader.

FIG. 2 is an example memory map 200 for target device 106 implementing the single-wire software bootloader described in reference to FIG. 1. Memory map 200 can correspond to memory 107 (e.g., flash memory) installed on target device 106. In some implementations, memory map 200 defines segments of flash memory on target device 106 for storing a reset vector, application code and bootloader code. The reset vector and bootloader code can be write-protected. In some implementations, the bootloader code can reside in the last n-bytes (e.g., 2K bytes) of memory. During memory upgrades, the reset vector as well as other interrupt vectors are protected and are not overwritten. The resources used by the bootloader can be made available by using an interrupt vector table shadow.

Example Single-Wire Bootloader Process

Figure 3:
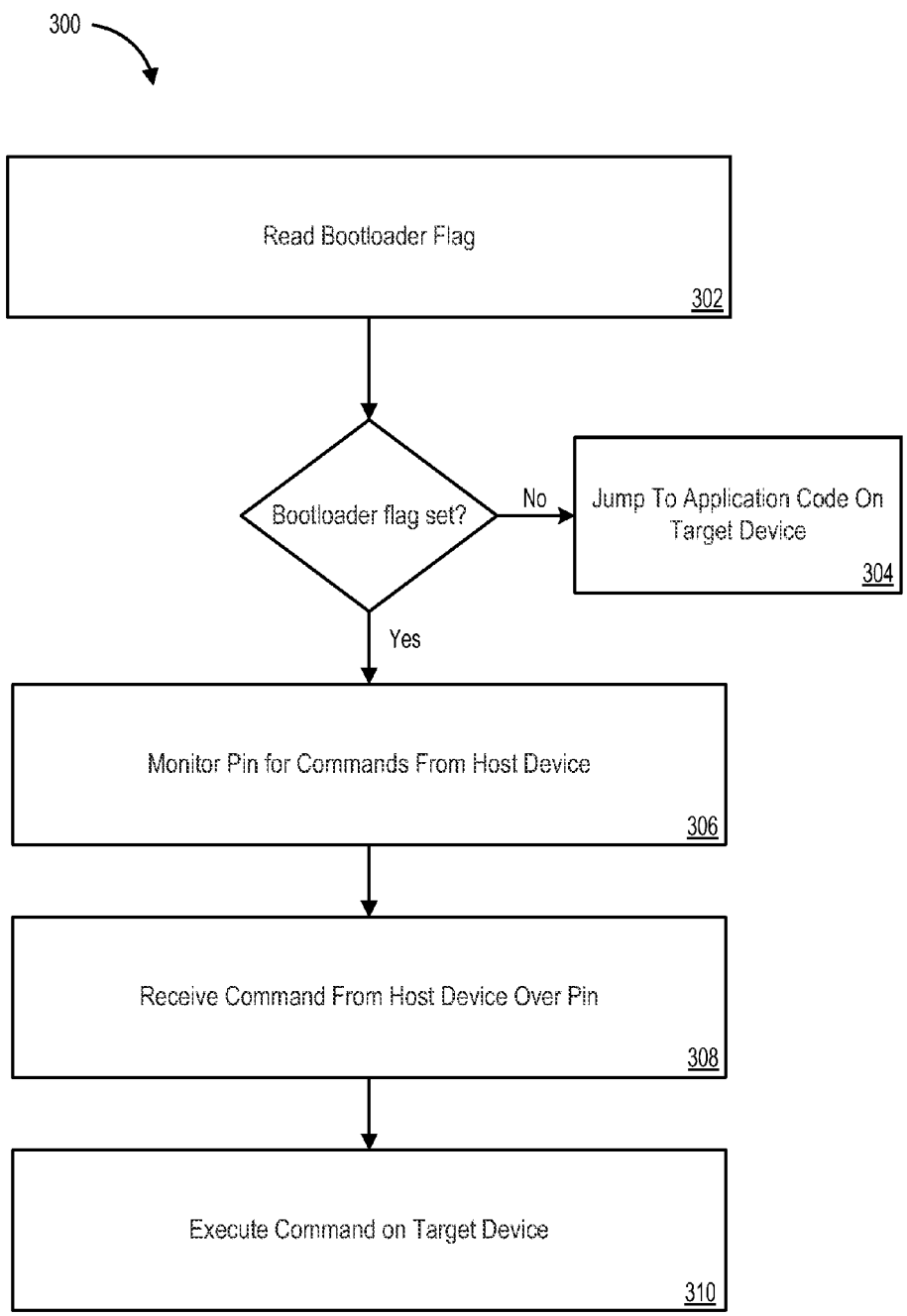
FIG. 3 is a flow diagram of an example process for a single-wire bootloader.

FIG. 3 is a flow diagram of an example process 300 for a single-wire bootloader. Process 300 can be implemented by system 100 described in reference to FIG. 1.

In some implementations, a bootloader flag can be set in non-volatile memory (e.g., EEPROM) of the target device, which can be programmed while programming the target device with bootloader code. Process 300 can begin after a target device reset by reading the bootloader flag (302). A reset can be initiated by a reset vector stored in write-protected memory of the target device. device. If the bootloader flag is not set the target device can jump to application code (304) that is stored in an application segment of memory of the target device.

If the bootloader flag is set, the target device executes the bootloader code (placing the target device in bootloader mode) and the bootloader starts to monitor a single GPIO pin for commands from the host device (306). In some implementations, the command can be text commands. When commands are received from the host device over the GPIO pin (308), the commands can be executed on the target device (310). For example, if a command is received from host device 102 for updating memory (e.g., program command), the received data can be written in the application segment of memory map 200. The bootloader code can reside in the last n-bytes of memory and be write-protected. Some example commands are program, erase and verify.

To put the target device in the bootloader mode from a running application, the application can set the bootloader flag in memory and execute a jump to the reset vector. The reset vector can then jump to the bootloader code in the bootloader segment of memory, as shown in FIG. 2.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method comprising:
  determining, by a target device, whether the target device is in bootloader mode;
  responsive to the target device being in bootloader mode:
    retrieving bootloader code from memory of the target device;
    executing the bootloader code on the target device;
    monitoring, by the executing bootloader code, a single pin of the target device coupled to a host device for commands from the host device;
    receiving one or more commands from the host device, the one or more commands received by a single-wire interface implemented in software on the target device; and
    executing the one or more commands on the target device;
  responsive to the target device not being in bootloader mode:
    retrieving application code from the memory of the target device; and
    executing the application code on the target device.

2. The method of claim 1, where the target device implements in software a single-wire Universal Asynchronous Receiver/Transmitter (UART) for receiving the commands on the single pin.

3. The method of claim 1, where the target device is a microcontroller and the single pin is a general-purpose I/O pin.

4. The method of claim 1, where the host device is coupled to the target device through a transceiver.

5. The method of claim 1, where the transceiver is an RS-232 transceiver.

6. The method of claim 1, where the commands are text commands.

7. The method of claim 1, further comprising:
  detecting a reset of the target device; and
  performing the monitoring in response to the detecting.

8. The method of claim 1, further comprising:
  setting a bootloader flag in memory using the executing application code;
  executing a reset vector stored in memory of the target device;
  retrieving the bootloader code from memory of the target device according to the reset vector; and
  executing the bootloader code on the target device.

9. A system for programming a target device, the system comprising:
  a host device configured to run a programmer application;
  a target device coupled to the host device and configured for:
    determining, by the target device, whether the target device is in bootloader mode;
    responsive to the target device being in bootloader mode:
      retrieving bootloader code from memory of the target device;
      executing the bootloader code on the target device;
      monitoring, by the executing bootloader code, a single pin of the target device coupled to the host device for commands from the host device;
      receiving one or more commands from the host device, the one or more commands received by a single-wire interface implemented in software on the target device; and
      executing the one or more commands on the target device;
    responsive to the target device not being in bootloader mode:
      retrieving application code from the memory of the target device; and
      executing the application code on the target device.

10. The system of claim 9, where the target device implements in software a single-wire Universal Asynchronous Receiver/Transmitter (UART) interface for receiving the commands on the single pin.

11. The system of claim 9, where the target device is a microcontroller and the single pin is a general-purpose I/O pin.

12. The system of claim 9, where the host device is coupled to the target device through a transceiver.

13. The system of claim 9, where the transceiver is an RS-232 transceiver.

14. The system of claim 9, where the commands are text commands.

15. The system of claim 9, further comprising:
  detecting a reset of the target device; and
  performing the monitoring in response to the detecting.

16. The system of claim 9, where the target device is further configured for:
  setting a bootloader flag in memory of the target device using the executing application code;
  executing a reset vector stored in the memory of the target device;
  retrieving the bootloader code from memory of the target device according to the reset vector; and
  executing the bootloader code on the target device.

17. An apparatus comprising:
  a pin;
  memory; and
  a processor coupled to the pin and configured for:
    determining, by a target device, whether the target device is in bootloader mode;

responsive to the target device being in bootloader mode:
   retrieving bootloader code from the memory of the apparatus;
   executing the bootloader code on the apparatus;
   monitoring, by the executing bootloader code, the pin of the apparatus for commands from a host device;
   receiving one or more commands from the host device, the one or more commands received by a single-wire interface implemented in software on the apparatus; and
   executing the one or more commands on the apparatus;
responsive to the target device not being in bootloader mode:
   retrieving application code from the memory of the apparatus; and
   executing the application code on the apparatus.

18. The apparatus of claim 17, where implementing the bootloader in the memory includes implementing a single-wire Universal Asynchronous Receiver/Transmitter (UART) interface for receiving the commands on the pin.

19. The apparatus of claim 17, where the processor is configured to:
   set, by the application code executing on the apparatus, a bootloader flag in the memory of the apparatus;
   execute a reset vector stored in the memory of the apparatus;
   retrieve the bootloader code from the memory of the apparatus according to the reset vector; and
   execute the bootloader code on the apparatus.

20. The apparatus of claim 17, where the apparatus is a microcontroller.

* * * * *